US009750360B2

(12) United States Patent
Price

(10) Patent No.: US 9,750,360 B2
(45) Date of Patent: Sep. 5, 2017

(54) DOUBLE-WALLED GLASS INSULATED CONTAINERS AND METHOD FOR PRODUCING SAME

(71) Applicant: Jeff Price, Windermere, FL (US)

(72) Inventor: Jeff Price, Windermere, FL (US)

( * ) Notice: Subject to any disclaimer, the term of this patent is extended or adjusted under 35 U.S.C. 154(b) by 0 days.

(21) Appl. No.: 14/565,916

(22) Filed: Dec. 10, 2014

(65) Prior Publication Data
US 2015/0216343 A1    Aug. 6, 2015

Related U.S. Application Data

(60) Provisional application No. 61/935,489, filed on Feb. 4, 2014.

(51) Int. Cl.
*A47G 19/22* (2006.01)
*C03C 27/10* (2006.01)

(52) U.S. Cl.
CPC .......... *A47G 19/2288* (2013.01); *C03C 27/10* (2013.01)

(58) Field of Classification Search
CPC  A47G 19/2288; B65D 38/3869; B65D 11/16; B65D 13/02; B29C 66/4312; B29C 66/438
USPC ....... 220/62.12, 62.18, 62.15, 610, 612, 678
See application file for complete search history.

(56) References Cited

U.S. PATENT DOCUMENTS

| 1,525,567 | A | | 2/1925 | Cadby | |
| 1,968,263 | A | | 7/1934 | Reuther | |
| 2,051,446 | A | | 8/1936 | Ice | |
| 2,070,672 | A | | 2/1937 | Hans | |
| 2,368,273 | A | | 2/1942 | Tibbetts | |
| 2,725,733 | A | | 12/1955 | Davis | |
| 3,502,243 | A | * | 3/1970 | Roth | B65D 7/34 220/680 |
| 3,827,925 | A | | 8/1974 | Douglas | |
| 4,151,923 | A | * | 5/1979 | Bernardi | A47G 19/2288 215/12.1 |
| 4,273,245 | A | * | 6/1981 | Hartinger Machalek | A47G 19/2288 215/12.1 |
| 4,372,459 | A | * | 2/1983 | Newman | B65D 7/04 156/294 |
| 4,415,387 | A | * | 11/1983 | Newman | B29C 65/48 156/198 |
| 4,485,636 | A | * | 12/1984 | Hilado | A47G 19/027 62/430 |
| 5,253,780 | A | | 10/1993 | Adado | |
| 5,261,554 | A | | 11/1993 | Forbes | |
| 5,513,764 | A | * | 5/1996 | Harrison | A47G 19/2255 215/372 |

(Continued)

*Primary Examiner* — Stephen Castellano
(74) *Attorney, Agent, or Firm* — Robert L. Wolter; Beusse, Wolter, Sanks & Maire PLLC

(57) ABSTRACT

A double walled glass container comprising an inner glass vessel for containing a liquid beverage is nested and hermetically sealed to an outer glass vessel, forming a unitary assembly with a co-extensive planar surface between inner and outer vessels. Said inner vessel is so constructed as to provide a gap between the two vessels wherein the interstitial space is an insulating air gap providing an insulating effect between the inner and outer vessels. The inner vessel also extends above the hermetic seal creating a single wall drinking rim. In addition, a customizable brand name or logo can be applied to the outer face of the inner vessel such that it is protected from the harsh environment of chemical cleaning and everyday use.

7 Claims, 11 Drawing Sheets

(56) References Cited

U.S. PATENT DOCUMENTS

| | | | |
|---|---|---|---|
| 6,050,443 A | 4/2000 | Tang | |
| 6,241,095 B1 | 6/2001 | Yencheng | |
| 6,308,846 B1* | 10/2001 | Muller | B65D 81/3841 215/12.1 |
| 6,361,898 B1* | 3/2002 | Honegger | H01M 2/361 220/612 |
| 6,405,892 B1* | 6/2002 | Volan | A47G 19/2288 215/12.1 |
| 6,629,618 B1 | 10/2003 | Volan | |
| 6,921,179 B2 | 7/2005 | Ghanem | |
| 7,229,181 B2 | 6/2007 | Diak/Ghanem | |
| D553,437 S | 10/2007 | Bodum | |
| 7,306,113 B2* | 12/2007 | El-Saden | A47J 41/0061 220/592.17 |
| 8,033,412 B2 | 10/2011 | Mayo | |
| 8,225,957 B1* | 7/2012 | Volan | A47J 41/0077 215/12.1 |
| 8,684,223 B1* | 4/2014 | Kalamaras | A47G 19/2288 215/12.1 |
| 2004/0212120 A1* | 10/2004 | Giraud | A47G 19/2288 264/102 |
| 2011/0062154 A1* | 3/2011 | Rhee | B65D 81/3869 220/62.12 |
| 2011/0260369 A1 | 10/2011 | Klofta et al. | |
| 2013/0175278 A1* | 7/2013 | Kah, Jr. | B65D 81/3869 220/592.2 |
| 2013/0313283 A1* | 11/2013 | Medico | B29C 65/40 222/107 |
| 2015/0313391 A1* | 11/2015 | Melton | A47G 19/2205 220/592.17 |

\* cited by examiner

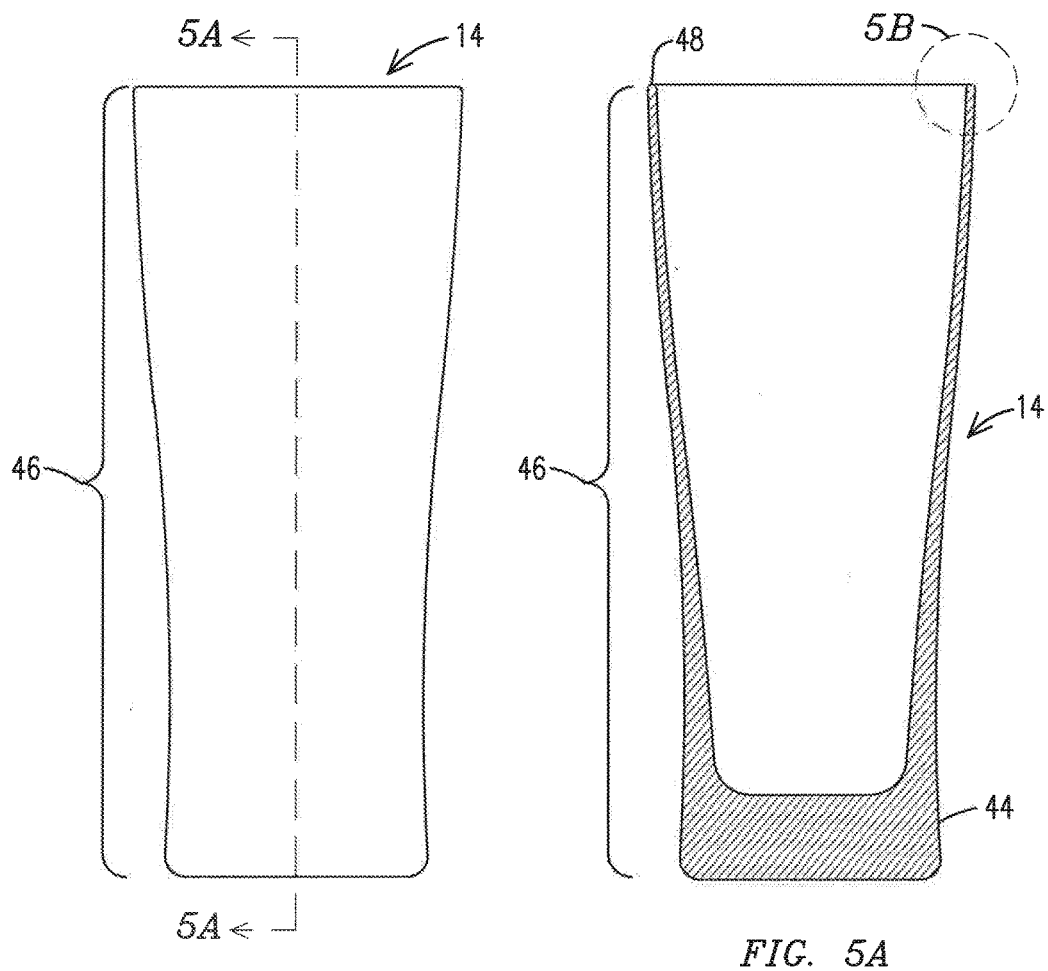
FIG. 5
FIG. 5A
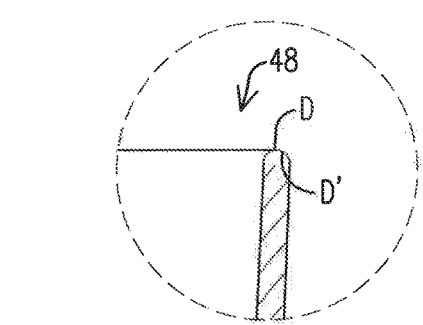
FIG. 5B
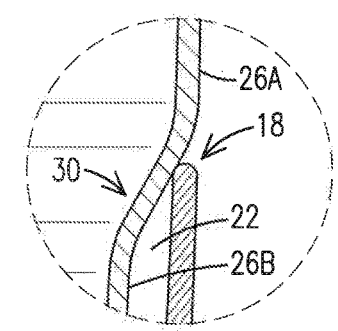
FIG. 6

DOUBLE-WALLED GLASS INSULATED CONTAINERS AND METHOD FOR PRODUCING SAME

CROSS-REFERENCE TO RELATED APPLICATIONS

This application claims the benefit of U.S. Provisional Application No. 61/935,489 filed Feb. 4, 2014, and incorporated herein by reference in its entirety.

BACKGROUND OF THE INVENTION

The present invention is in the technical field of glassware. More specifically, the present invention is in the technical field of drinking containers. More specifically, the present invention is in the field of insulating drinking containers.

It is known that when a cold drink or liquid such as beer is contained within a glass container, the contents of the glass will eventually warm to ambient room temperature. The rate of warming is proportional to the difference in temperature of the liquid and the surrounding environment and is also proportional to the effective thermal conductivity of the container itself. Furthermore, the heat transferred from the hand of the consumer accelerates the warming process and also induces an unpleasant cooling of the hand. Throughout the warming process, condensation occurs, creating water droplets on the outside of the container which are transferred to the hand and the supporting furniture, both of which are undesirable. The condensation also poses a safety hazard as the container may slip from the hand of the consumer as it is being picked up or held.

Containers designed to address the above concerns are known from the Prior Art. "Double-Walled" drinking vessels, e.g., tumblers, cups, mugs, etc., are widely available in the retail market. These vessels are typically constructed of acrylic, polycarbonate, or similar (typically transparent) plastic materials using an inner and outer container, each having sidewalls and a bottom. The two vessels are brought together and "nested" in such a manner as to allow for an insulating air gap between the inner and outer vessel at which time the two vessels are joined at their interface in a cemented, fastened, ultrasonic welded, or similar method.

While these containers address the above concerns of keeping a beverage colder for a longer period of time as well as preventing condensation on the outside of the container, many people do not like the "feel" of plastic and prefer the premium "feel" of glass for their cold beverages such as beer when freshly poured from a tap. Almost without exception, glass is used in finer restaurants and bars when serving cold drinks such as beer due to customer preference.

Double walled glass containers do exist; however, these containers are typically made from a borosilicate glass, which is a thermally shock resistant glass, and is used for hot beverages and have the fusion seam between the inner and outer walls at the rim of the glass where the consumer places their lips to take a drink. An example can be found under Bodum U.S. Pat. No. D553,437. The point of fusion, at the rim, creates a "bulbous" feel and is not desirable for cold drinks such as beer. Beer glasses typically made from a soda-lime based glass, have a single, thin-walled drinking rim which the consumer is accustomed to and finds more desirable. The rim shape is defined by the method of manufacture and is either a "cut-off" or "burn-off" which will be discussed further below.

As such, there is a need for a premium, double walled glass container that embodies a single, thin-walled drinking rim, incorporates a continuous outer surface, and exhibits an improved insulation effect through the use of an air-gap between the inner and outer vessel walls which results in both keeping a cold drink cold longer and eliminating condensation on the outer wall of the outer vessel. In addition, these containers must not only be aesthetically attractive and produced of a high quality standard worthy of being served in the fine restaurant and bar market, they must be produced in an economical manner to appeal to these markets.

SUMMARY OF THE INVENTION

The present invention embodies an insulating glass drinking vessel comprising an inner glass vessel for containing a liquid beverage that at is at least partially nested within and hermetically sealed to an outer glass vessel, forming a continuous unitary assembly. The hermetic seal being a water-tight seal. The inner vessel is so constructed as to provide an interstitial air-filled space between the two vessels, providing an insulating effect between the inner and outer vessels. The two vessels are hermetically sealed below the rim of the inner vessel a sufficient distance to prevent contact with the lips during drinking. In addition, a customizable brand name or logo can be fused or affixed to the outer face of the inner vessel such that it is protected from the harsh environment of chemical cleaning and everyday use.

Also disclosed herein is a method for assembling an insulated double-walled beverage glass providing an outer glass vessel having a bottom, a generally upright circumferential wall integrally formed with the bottom and a rim on the wall is distal to the bottom. In addition, the method further comprises providing an inner glass vessel having a bottom, a generally upright circumferential wall integrally formed with the bottom and a rim on the wall distal the bottom, wherein the wall includes a lower portion connected to the bottom and an upper portion having the rim, and the upper portion has a diameter that is larger than a diameter of the lower portion forming a transition area there between.

The outer glass vessel and the inner glass vessel are axially and concentrically aligned relative to one another in respective horizontal positions. The method further comprises transversely positioning the outer glass vessel into contact with the inner glass vessel wherein the rim of the outer glass vessel is in contact with the inner glass vessel at the transition area.

The inner and outer glass vessels are then synchronously rotated about a common longitudinal axis, as a light-cure adhesive is dispensed along a circumferential contact joint between the rim of the outer glass vessel and the transition area of the inner glass vessel. The inner and outer glass vessels are rotated for at least one full revolution as the adhesive is dispensed. In addition the method further comprises exposing the light-cure adhesive to ultra violet radiation as the inner and outer glass vessels are synchronously rotated for at least one full revolution.

BRIEF DESCRIPTION OF THE DRAWINGS

FIG. 5 is an elevational view of an outer vessel of the double-walled insulated glass container of FIG. 1

FIG. 5A is a sectional view of the outer vessel taken along line 5A-5A of FIG. 5.

FIG. 5B is a detailed sectional view of a rim of the outer vessel of FIG. 5A

FIG. 6 is a detailed sectional view of the interface between the inner vessel and outer vessel before a seal is established at the interface.

DETAILED DESCRIPTION OF THE INVENTION

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained.

Figures 1, 2:
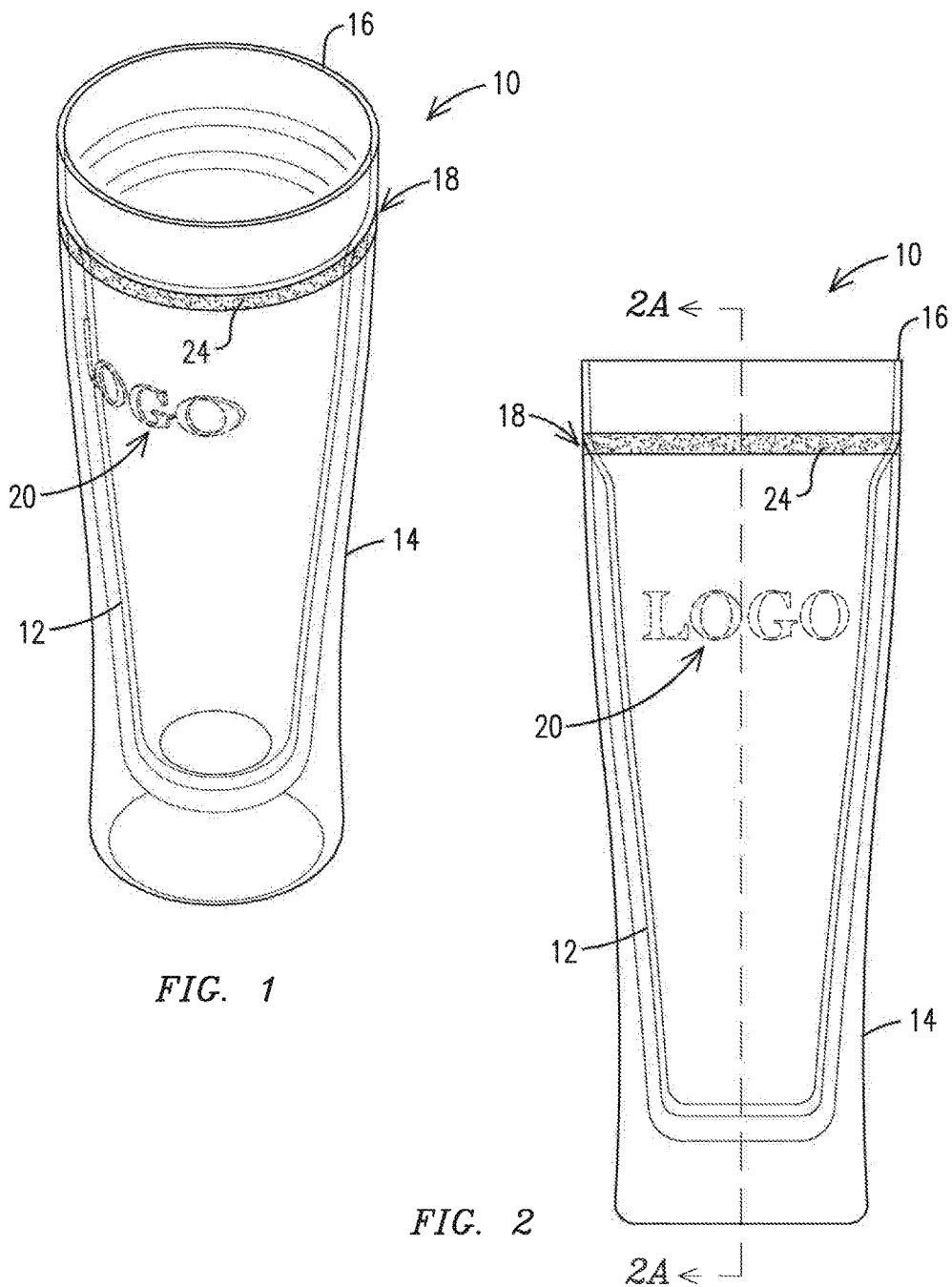
FIG. 1 is a perspective view of an embodiment of the present invention for a double-walled insulated glass container.
FIG. 2 is an elevational view of the glass vessel of FIG. 1.

With respect to FIG. 1 a double-walled glass insulated beverage container 10 is shown, and in a preferred embodiment comprises an inner vessel 12 and outer vessel 14 joined together and sealed at a circumferential interface joint 18 of the inner vessel 12 and outer vessel 14. In addition, the container 10 includes a single wall, drinking rim 16 of the inner vessel 12 spaced above the interface joint 18. As further shown in FIGS. 1 and 2, a logo 20 may be etched or applied onto the outer surface of the inner vessel 12. While the embodiment shown in FIG. 1, and other drawings disclosed herein, has a generally tapered configuration, the invention is not so limited and may include any shape that may be used to design a beverage container. For example, the embodiments of the invention may be incorporated with a beverage glass that includes a stem and foot, and the beverage container portion has a truncated spherical shape. Moreover, any dimensions used to describe embodiments of the invention are provided by way of example only, and not intended to any way limit the invention.

Figure 2A:
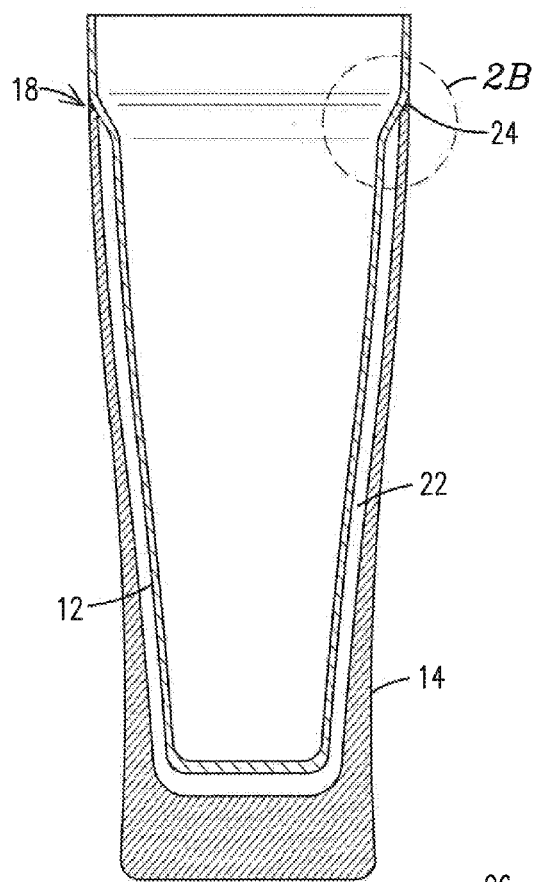
FIG. 2A is a sectional view taken along line 2A-2A of FIG. 2.
Figure 2B:
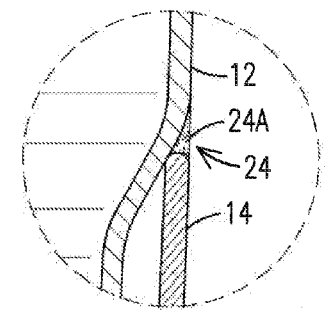
FIG. 2B is detail view of a hermetic seal of the container of FIGS. 2 and 2A

As may be appreciated in reference to FIGS. 2A and 2B, the container 10 has a gap or interstitial space 22 between the inner and outer vessels, 12, 14. For a sixteen ounce container 10 that is about 3.2 inches in diameter at the rim 16, 2.3 inches in diameter at its lower end, and about 8.0 inches in overall height, the interstitial space 22 may be a distance of 0.2 inches, for example, from inner to outer vessel perpendicular to their faces. As will be described in detail below, this interstitial space 22 comprises air and an adhesive seal 24 hermetically seals the interstitial space 22 along the interface joint 18 between the inner vessel 12 and outer vessel 14. Again, as will be described in more detail below, a light cure adhesive is used to establish the hermetic seal 24.

Figure 3:
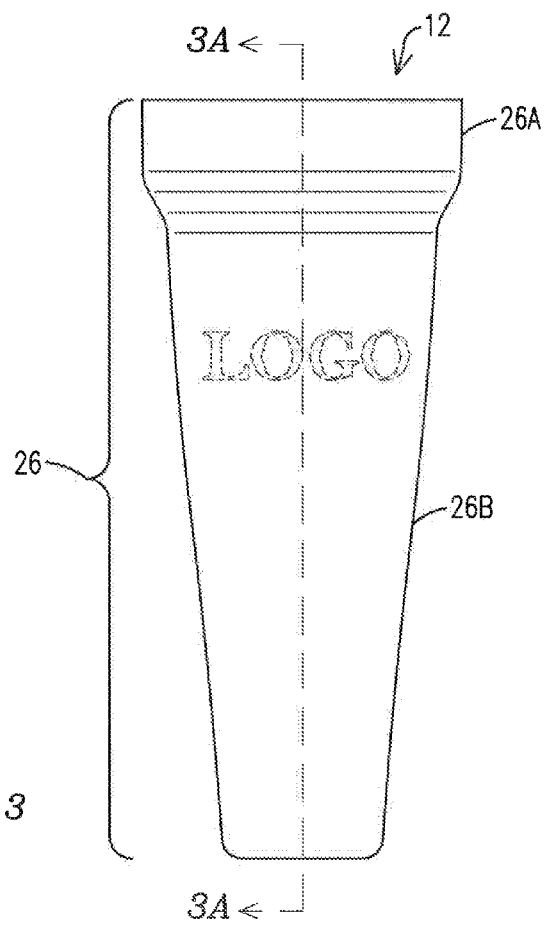
FIG. 3 is an elevational view of an inner vessel of the container of FIG. 2.
Figure 3A:
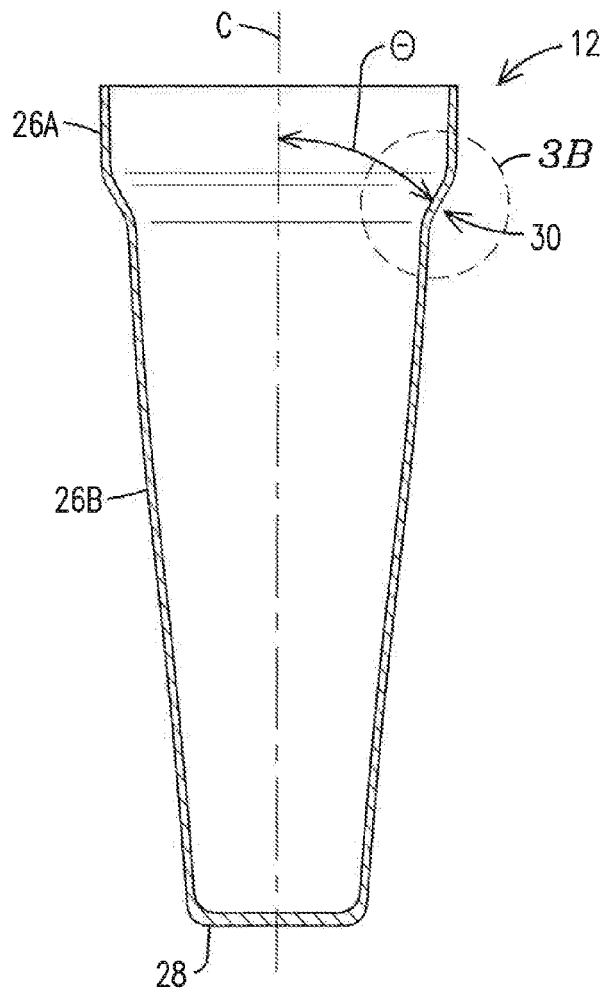
FIG. 3A is a sectional view taken along line 3A-3A of FIG. 3.
Figure 3B:
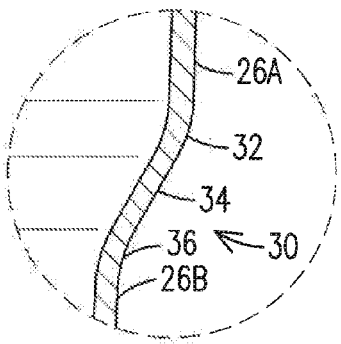
FIG. 3B is a detailed view of a transition region of the inner vessel.

The inner vessel 12 is illustrated in more detail in FIGS. 3, 3A and 3B. The inner vessel 12 includes a generally upright circumferential wall 26 integrally formed with a bottom 28 of the vessel 12. The circumferential wall 26 includes an upper portion 26A and a lower portion 26B wherein the upper portion 26A has a lower most diameter that is larger than an upper most diameter of the lower portion 26B and in the immediate vicinity of a transition 30 between portions 26A, 26B. The upper and lower portions 26A, 26B are interconnected through the transition of outer radius 32, frusto-conical section 34, and inner radius 36. The Angle θ of frusto-conical section 34 relative to longitudinal centerline C would be, for example, 30 degrees for a distance of 0.2 inches. In the example, of the above-referenced sixteen ounce container, the wall thickness of the inner vessel 12 at the rim 16 is about 0.07 inches.

Figure 4:
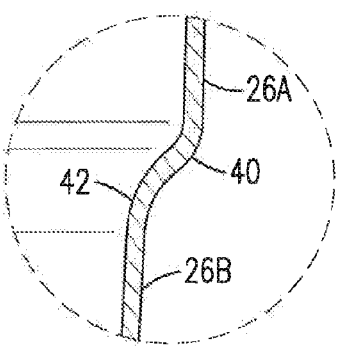
FIG. 4 is a detailed sectional view of a transition region of an inner vessel of a second embodiment.

The above-referenced transition 30 includes the outer radius 32, inner radius 36 and any glass there between, such as the frusto-conical section 34; however, the transition 30 may include less of a transition area or transition glass between radii 32, 36. As shown in FIG. 4, the upper and lower portions 26A, 26B may be interconnected through the transitions of outer radius 40, and inner radius 42 without the frusto-conical section referenced above in reference to FIGS. 3, 3A, 3B. The angle at the outer radius 40 relative to a longitudinal centerline of the inner vessel may be, for example, 45 degrees.

With respect to FIGS. 5, 5A and 5B, the outer vessel 14 is illustrated in more detail. The outer vessel 14 includes a base or bottom 44 integrally formed with an upright generally circumferential wall 46. The wall thickness, for example for the above-described sixteen ounce container, may be approximately 0.07 inches and generally increases in thickness down to the bottom 44. The bottom 44 may be thicker than that of the wall 46 and keeps the container 10 upright, stable and promotes the appearance of a traditional beer (beverage) glass. This heavy bottom is also known as a "sham." The upper rim 48 in this configuration is known as a "burn-off" rim in the industry and is generated by rotating the vessel within an annular flame which ultimately burns off the excess material, leaving a smooth rounded edge. Diameter D is the outside diameter on rounded rim 48 and Diameter D' is the inside diameter on rounded rim 48. Another known rim configuration that may be used with embodiments of the invention is known as a "cut" rim in the industry and is generated by scoring the outer surface of the vessel with a laser or diamond or similar and then breaking the excess waste material off creating a square cut edge.

FIG. 6 is a sectional view and detailed sectional of the inner vessel 12 of FIG. 3 disposed within the outer vessel 14 of FIG. 5 creating an interstitial space 22 terminating at a circumferential contact joint 18 between the inner and outer vessels, 12, 14. As described in more detail below, and above with respect to FIG. 2B, An adhesive, hermetic seal 24 (shown in FIG. 2B) is provided between the inner vessel 12 and outer vessel 14 at the joint 18 and at the transition 30 between the inner and outer radii 32, 36, and slightly below the upper portion 26A. The seal 24 may be composed of a light cure adhesive. The outer surface 24A of seal 24 tangentially connects the outer surface of inner vessel 12 with the outer surface of outer vessel 14 at inner and outer radii 32, 36, such that the surface 24A is coextensive with the outer surfaces of the inner vessel 12 and outer vessel 14. The outer surface of the glass has a flush surface extending from the outer surface of the inner glass vessel, along the outer surface of the light-cure adhesive and to the outer surface of the outer glass vessel.

Figure 7A:
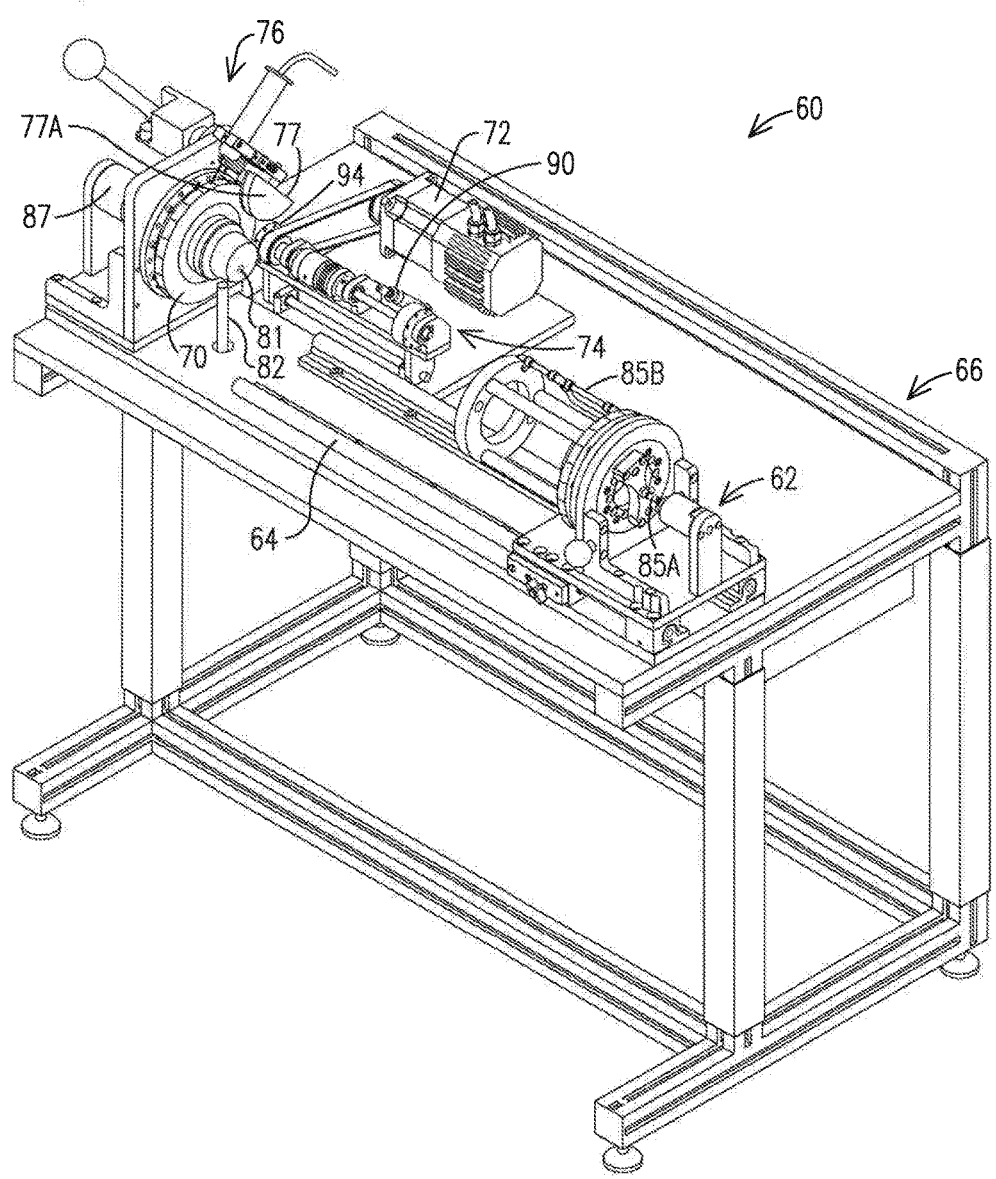
FIG. 7A is a perspective view of an assembly machine used to assemble the double-walled insulated glass container of the present invention.
Figure 7B:
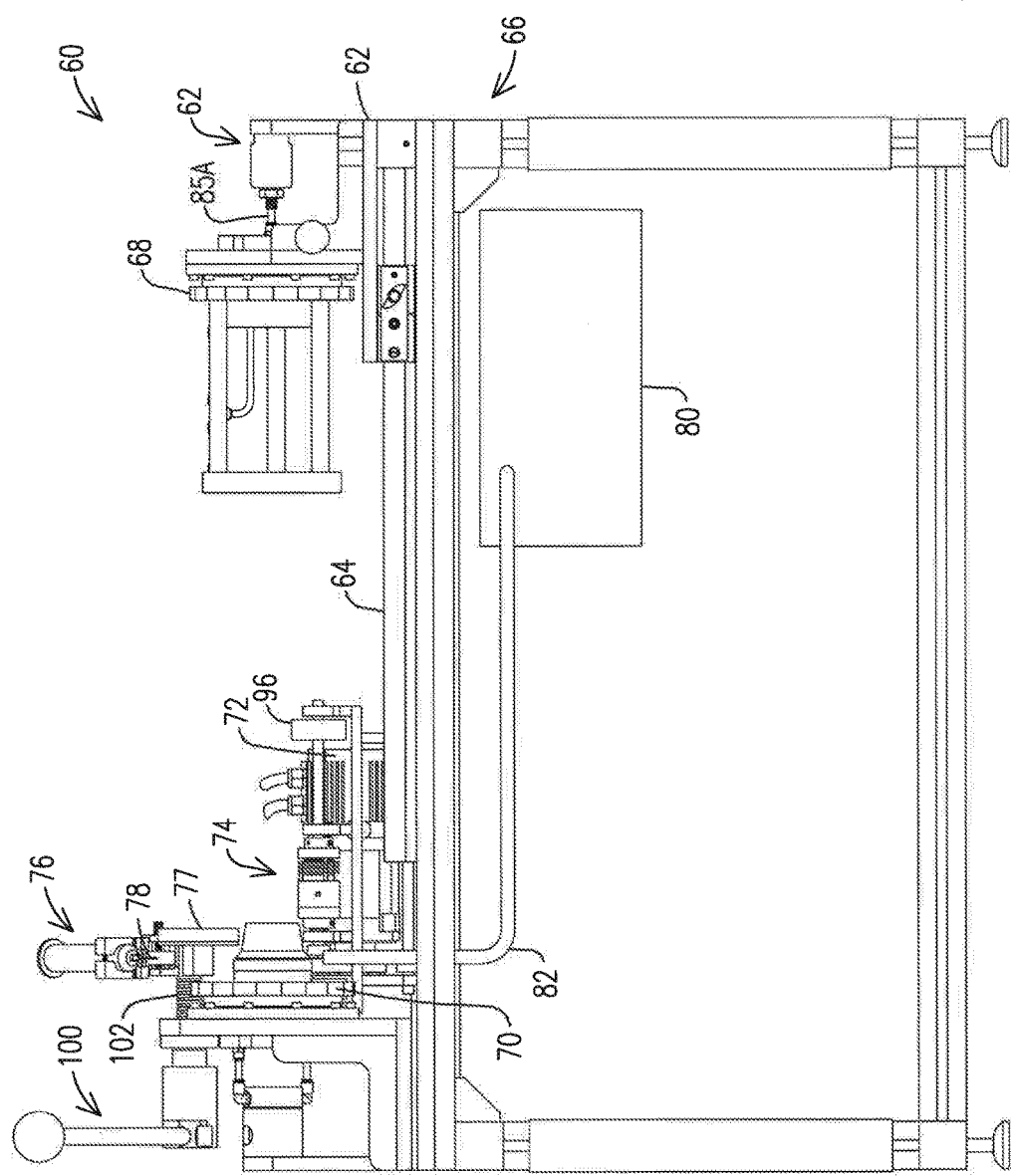
FIG. 7B is a side view of the assembly machine.
Figure 7C:
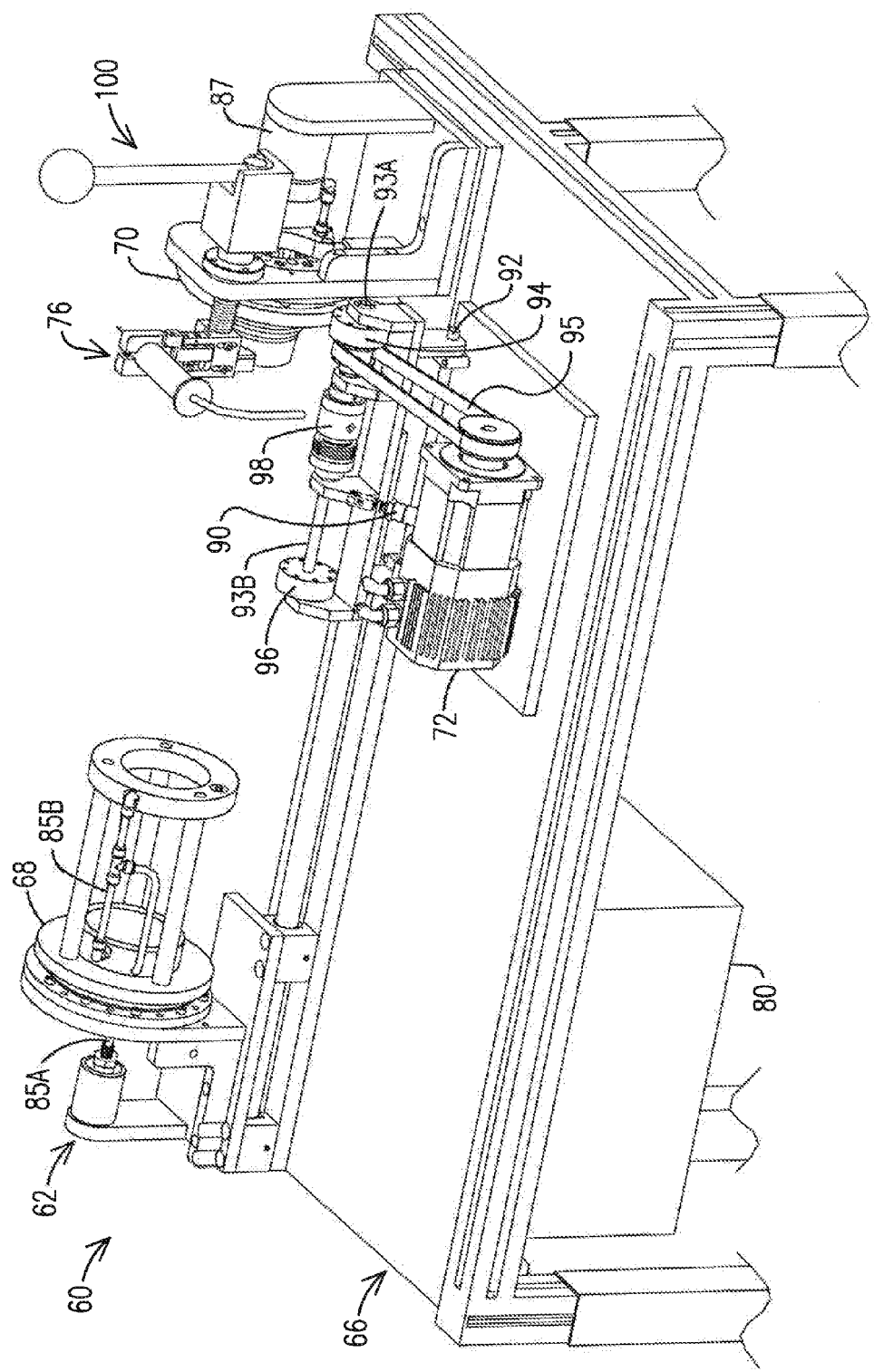
FIG. 7C is a rear perspective of the assembly machine.

With respect to FIGS. 7A, 79, and 7C an assembly machine 60 is illustrated and may be used to assemble the above-described double-walled glass insulated container. The assembly machine 60 includes a carriage 62 used to support the outer vessel 14. The carriage 62 is moveable along a track 64 on table 66 to position the outer vessel 14 relative to the inner vessel 12 to form the double-walled glass container. Movement of the carriage 62 may be performed manually or with an automated linear actuator.

The carriage 62 includes a rotating plate 68 to which outer glass vessel 14 is secured, and the inner glass vessel 12 is supported by rotating plate 70. Both plates 68, 70 are caused to synchronously rotate during dispensing of the light cure adhesive at the transition area 30 or the interface between the inner vessel 12 and outer vessel 14, as will be explained more detail. To that end, a motor 72 and drive assembly 74, as will be described below, are used to initiate and control rotation of the plates 68, 70. The motor may be a servo-controlled motor or stepper motor Other operating components of the assembly machine 60 include an adhesive dispenser 76 with a dispenser tip 78. The dispenser 76 is fixed to a pivoting mechanism for positioning relative to the interface joint 18 between the two vessels 12, 14. In addition, an ultraviolet light source 80 An example of an ultraviolet light source is the Dymax BlueWave® 200 version 3.0, which is a high-intensity, light-curing spot-lamp system. This spot-curing lamp emits energy in the UVA and visible portion of the spectrum (300-450 nm) for light curing of adhesives and light guide 82 are provided for curing the adhesive applied to the glass vessels 12, 14.

Figure 8:
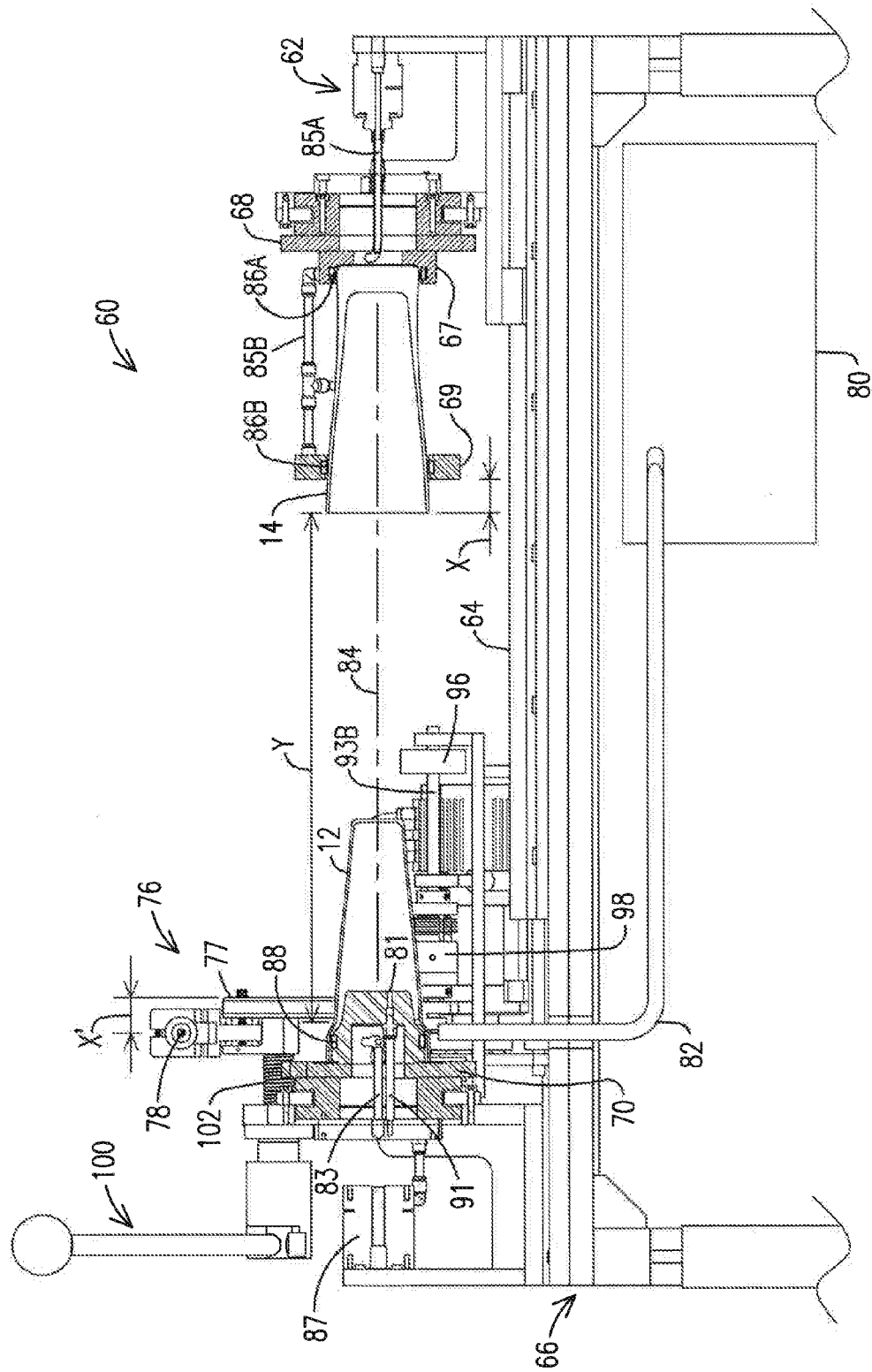
FIG. 8 is a side sectional view of the assembly machine with inner and outer vessels supported and ready for engagement.

With respect to FIG. 8, the outer vessel 4 is loaded onto the carriage 62 using a gauging tool (not shown) to ensure a proper offset X, which will ensure proper alignment of dispensing tip 78 and alignment with axis 84. As shown in FIGS. 7A, 8, 9 and 10, an abutment 77 is operatively connected to the dispenser 76 and shaft/spring assembly 102. The abutment 77 includes a disc face 77A which is spaced from the dispenser tip 78 an offset distance X'. Inflatable seals 86A and 86B, within mounting discs 67, 69, inflate to secure the outer vessel 14 to the carriage 62 and rotating plate 68. Inner vessel 12 is centrally aligned along axis 84 and secured with inflatable seal 88 to rotating plate 70. A vacuum is also supplied from rotating manifold 87 from a vacuum source (a vacuum pump not shown) to the inside of the inner vessel 12 to hold it secure against the rotating plate 70. The vessels 12, 14 are concentrically aligned and centered on axis 84.

Figure 9:
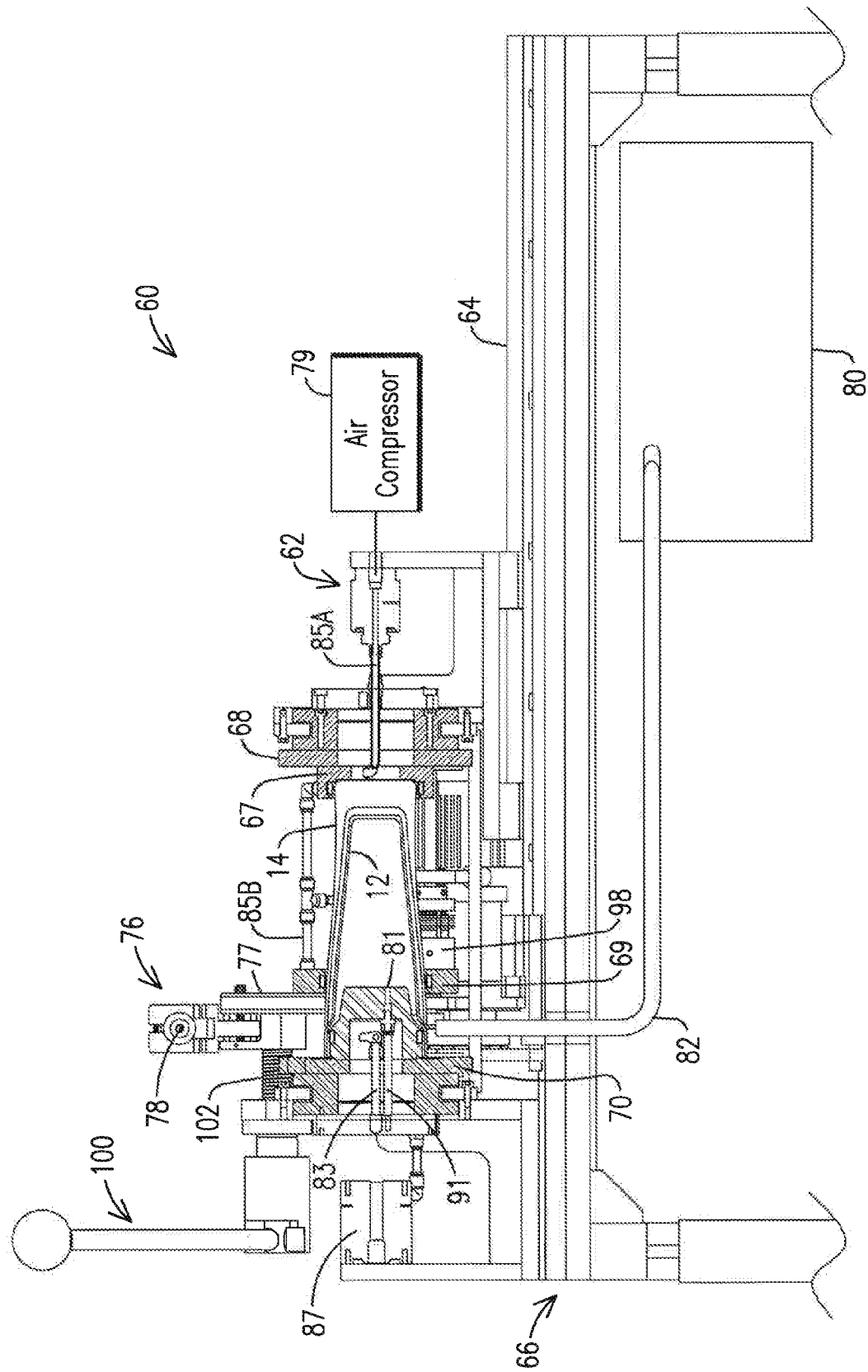
FIG. 9 is a side sectional view of the assembly machine with the outer vessel having been transversely disposed for engagement with the inner vessel.
Figure 10:
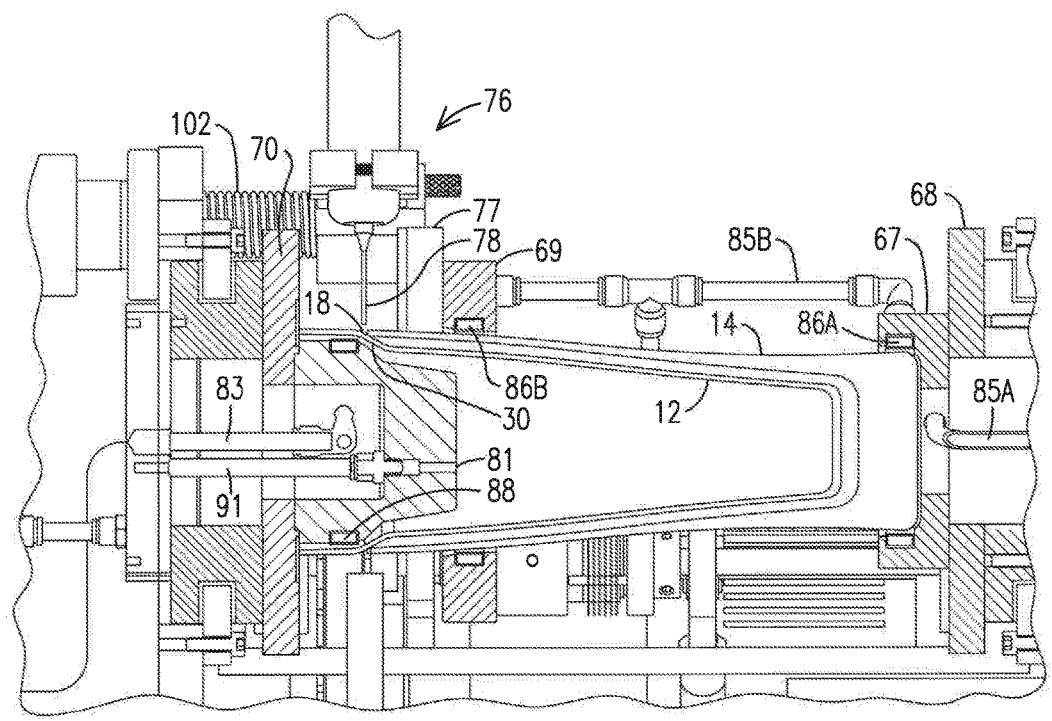
FIG. 10 is a partial sectional view of the assembly machine with a dispensing tip positioned and aligned to dispense a light cure adhesive.

As best shown in FIGS. 9 and 10, air lines 85A, 85B provide fluid flow communication between the seals 86A, 86B and an air compressor 81 to inflate the seals 86A, 86B. Similarly, an airline 83 is provided to supply air to inflatable seal 88 from an air compressor (not shown), which could be as the same compressor 79. In addition, as further shown in FIG. 10, an airline 91 is fixed to hub 93, and aligned with a hole 63 to provide fluid flow communication between a vacuum pump (not shown) and an internal volume of the inner glass vessel 12. A vacuum having a power of about twenty inches of Hg should be sufficient to secure the inner glass vessel 12 in place for assembly.

As shown in FIGS. 8 and 9, the carriage 62 is transversely moved across the table 64 along axis 84 and towards the inner vessel a distance Y so the rim 48 of outer vessel 14 contacts the inner vessel 12 forming the interface joint 18 between the two vessels 12, 14. For example, for the above-described sixteen ounce container, the distance may be about ten inches. While the embodiment described herein includes the outer glass vessel 14 as being transversely positioned, the invention is not so limited. Indeed, the assembly machine 60 may be configured such that the inner glass vessel 12 is moveable on the table 66, or both vessels 12, 14 are transversely moveable on the table 66.

Because glass dimensions or shapes may be subtly different from glass to glass the distance Y that the outer vessel 14 may travel may vary. For example, the diameters of consecutive outer vessels to be assembled may be different. A first outer vessel may have a diameter at its rim that is slightly smaller than a second outer vessel. In such a case the second outer vessel may have to be moved to the left (see FIG. 8) farther than the first outer vessel before the rim of the second. However, the offset distance X from the face of mounting disc 69 to the rim 48 of the outer vessel 14 is preferably set to be the same from assembly of one double-walled container to the next. When mounting disc 67 pushes against the abutment 77 so the rim 48 of the outer vessel 14 contacts the inner vessel 12, the dispenser 76 and tip 78 are moved a distance equal to the offsets X and X', so that the tip 78 is positioned directly over the area at which the rim 48 of the outer vessel 14 contacts the inner vessel 12 to apply the adhesive.

Cylinder 90 (FIGS. 7A and 7C) is extended causing drive assembly 74 to pivot forward about shaft 92 until a forward rubber wheel 94 and a rear rubber wheel 96 make contact with plates 70, 68, respectively.

With respect to FIGS. 7A and 7C, an explanation of drive assembly 74 is described. A first shaft 93A is directly coupled to belt 95 and a second shaft 93B is coupled to the first shaft 93A through a clutch and brake unit 98. When clutch and brake unit 98 is in "brake" mode, both shafts 93A and 93B rotate simultaneously in the same direction. When the clutch and brake unit 98 is in "clutch" mode, shaft 93B will stop rotating as shaft 93A continues to rotate.

Motor 72 is energized, rotating belt 96 in a counterclockwise direction when facing the motor 72 from the side of the table 66 on which the carriage 62 is positioned. With clutch and brake unit 98 in brake mode, shafts 93A and 93B rotate in unison as well as rubber wheels 94, 96 in a counterclockwise direction. Due to the direct contact between the rubber rotating wheels 92, 94 and the rotating plates 70, 68, the rotating plates 70, 68 are driven in a clockwise direction at a rotational speed range of approximately 15 to 60 RPM allowing for the synchronous rotation of the inner and outer vessels 12, 14 about the axis 84. (FIG. 8). The motor 72 may be an AC or DC servo-controlled motor or stepper motor, and may be 1/16 to 1/4 hp.

Figure 11:
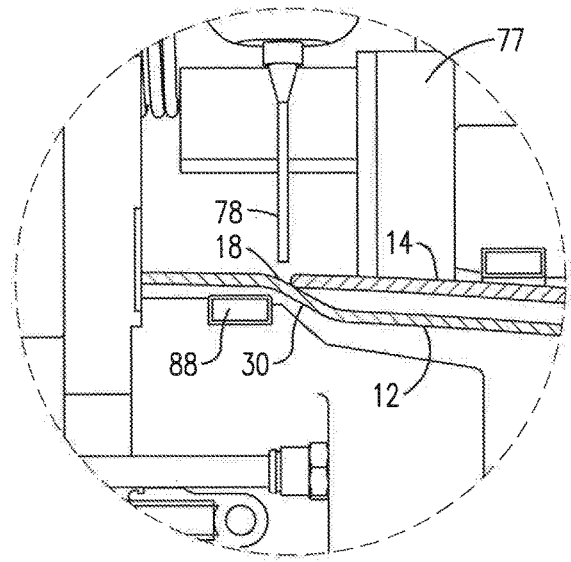
FIG. 11 is a partial sectional view of the glass container on the assembly machine with the light curable adhesive dispensed at interface joint between the inner and outer vessels.

As may be appreciated from FIG. 9, while inner vessel 12 and outer vessel 14 rotate synchronously, the dispenser 76 with the dispensing tip 78 is pivoted into position using handle 100 and pivot shaft and spring assembly 102 to the position shown in FIGS. 10 and 11, just above joint 18.

A supply valve (not shown) on the dispenser 76 is opened allowing a light cure adhesive to flow from dispensing tip 78 into the joint 18 as inner and outer vessels 12, 14 rotate synchronously for one or more revolutions. Suitable light cure adhesives would include Dymax® 425™ and Loctite® 3493™ that use an ultraviolet light wavelength of 365 nm with an intensity of 50 mW/cm$^2$ to achieve a fixture time shear strength of 0.1 N/mm$^2$ in 5 to 10 seconds depending on the product. In addition, these adhesives have excellent resistance to humidity and boiling water immersion for extended periods of time and have the transparency of glass. The viscosity of the light cure adhesive is roughly 4,000 cP (centipoise) and has the consistency of molasses or honey at room temperature. Light cure adhesive supply valve (not shown) is then closed when the appropriate amount of adhesive is dispensed over one or more revolutions.

The clutch and brake unit 98 is then energized into "clutch" mode which allows the inner vessel 12 to continue rotation while outer vessel 14 is stopped. This "relative" rotation further evenly distributes the light curable adhesive along any imperfections (voids or excess of adhesive in random spots) over the entire circumferential interface joint 18 and any area between the outer surfaces of the inner and outer vessels 12, 14 along the circumferential joint 18. This relative rotation preferably occurs for a minimum of one complete revolution.

Clutch and brake unit 98 is then energized into "brake" mode which allows the inner vessel 12 to rotate synchronously with outer vessel 14 for at least one full revolution.

In an alternative embodiment, instead of activating the clutch mode, the brake mode is maintained; however, the inner or outer glass vessels 12, 14 is rotated faster or slower than the other for at least one for one full revolution. Then, both vessels are rotated at the same rotational speed for application of the ultra-violet light.

Figure 12:
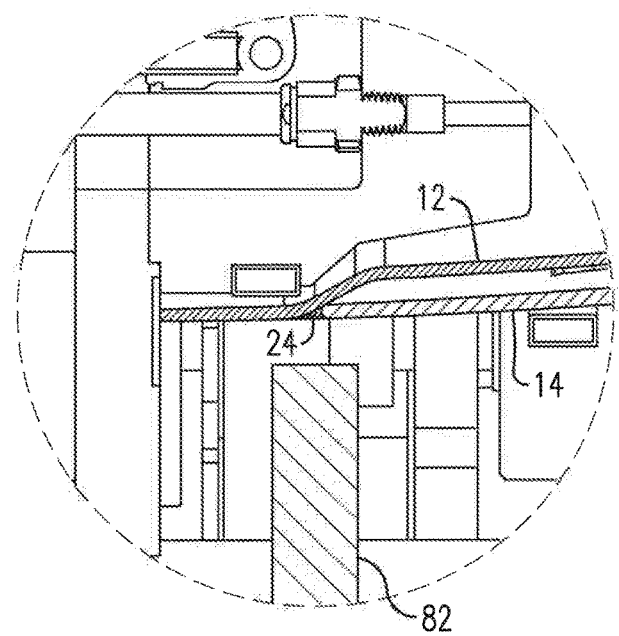
FIG. 12 is a partial sectional view of the glass container on the assembly machine with an ultraviolet light guide to supply ultraviolet light to cure the adhesive.

As shown in FIG. 12, an ultraviolet light guide 82 is supplied ultraviolet light from the ultraviolet light source 80 (FIG. 8) and is now energized, fusing the light cure adhesive as the inner and outer vessels 12, 14 rotate over the stationary light guide 82. The ultraviolet light source 80 is activated for a minimum of one full rotation of the vessels creating a unitary assembly 10.

The process is complete and the fully assembled double wall vessel 10 (FIG. 2) is removed from assembly machine 60.

Figure 13:
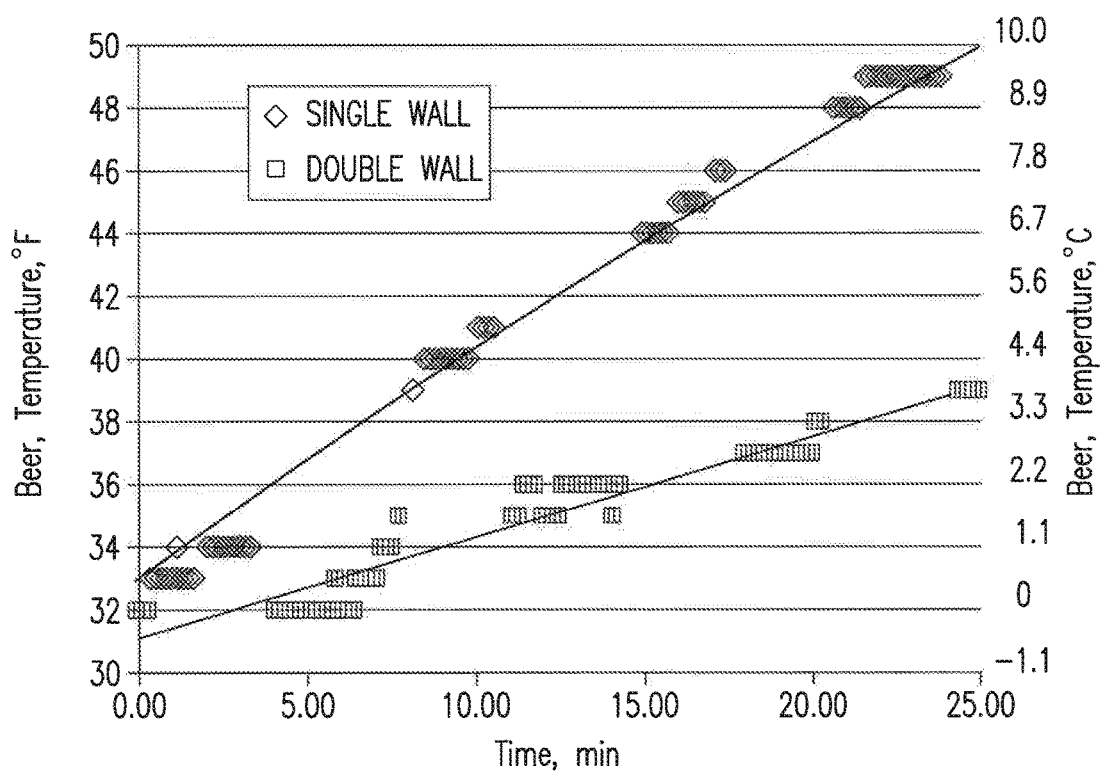
FIG. 13 is a graph illustrating the temperature difference of the single wall versus double walled glass system.

FIG. 13 is a graph comparing the actual temperature of a beverage in a single walled glass compared to a similarly shaped double walled glass in an outside environment over a 25 minute period. The environmental conditions are shown on the graph. Temperature results were recorded using a Lascar thermocouple EL-USB-TC-LCD and were downloaded directly to a computer database for analysis and graphing.

While certain embodiment of the present invention have been shown and described herein, such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An insulated double-walled beverage glass, comprising:
    an outer glass vessel having a bottom, a generally upright circumferential wall integrally formed with the bottom and terminating at a rim, and the wall of the outer glass having inner and outer surfaces;
    an inner glass vessel having a bottom and a generally upright circumferential wall having inner and outer surfaces and the wall of the inner glass is integrally formed with the bottom;
    wherein the upright circumferential wall of the inner glass vessel comprises a lower portion that is integrally attached to an upper portion including a rim and the upper portion has a diameter that is larger than a diameter of the lower portion forming a transition area from the lower portion to the upper portion, and the lower portion of the inner glass vessel is disposed within the outer glass vessel; and,
    the rim of the outer glass vessel abuts the inner glass vessel at the transition area;
    a hermetic seal formed from a light-cure adhesive between the rim of the outer glass vessel and the transition area of the inner vessel, such that an outer surface of the glass comprises the outer surface of the outer glass vessel, the outer surface of the inner glass vessel and an outer surface of the light-cure adhesive that connects the outer surface of the outer glass vessel with the outer surface of the inner glass vessel and is coextensive with the outer surfaces of the outer glass vessel and the upper portion of the inner vessel, the outer surface of the glass has a flush surface extending from the outer surface of the inner glass vessel, along the outer surface of the light-cure adhesive and to the outer surface of the outer glass vessel; and,
    an air-filled interstitial space extending between the wall and bottom of the outer glass vessel and the wall and bottom of the lower portion of the inner glass vessel.

2. The insulated double-walled beverage glass of claim 1, wherein the transition area includes an inner radius at the lower portion of the inner glass and an outer radius at the upper portion of the inner glass vessel and the outer glass contacts the inner glass at the outer radius.

3. The insulated double-walled beverage glass of claim 1, wherein the outer surface of the inner glass vessel along the transition area includes an inner radius at the lower portion of the inner glass vessel and an outer radius at the upper portion of the inner glass vessel and the outer glass contacts a frusto-conical transition of the inner glass between the inner radius and outer radius.

4. The insulated double-walled beverage glass of claim 1, wherein the rim of the outer glass has a rounded arcuate shape that continuously extends between the inner surface and the outer surface of the outer glass.

5. The insulated double-walled beverage glass of claim 1, wherein the transition area includes the inner and outer surfaces of the wall of the inner glass that are disposed at a common angle relative to a center longitudinal line of the inner glass.

6. The insulated double-walled beverage glass of claim 1, wherein the transition area of the inner glass is disposed at an angle of about 30 degrees or about 45 degrees relative to a center longitudinal line of the inner glass.

7. The insulated double-walled beverage glass of claim 1, wherein the light-cure adhesive spans a gap between the outer surface of the outer glass vessel and the outer surface of the inner glass vessel to connect the outer surface of the outer glass vessel with the outer surface of the inner glass vessel along the gap.

* * * * *